G. M. CHENEY.
SYSTEM OF ENSILING.
APPLICATION FILED JUNE 19, 1915.
1,188,623.
Patented June 27, 1916.
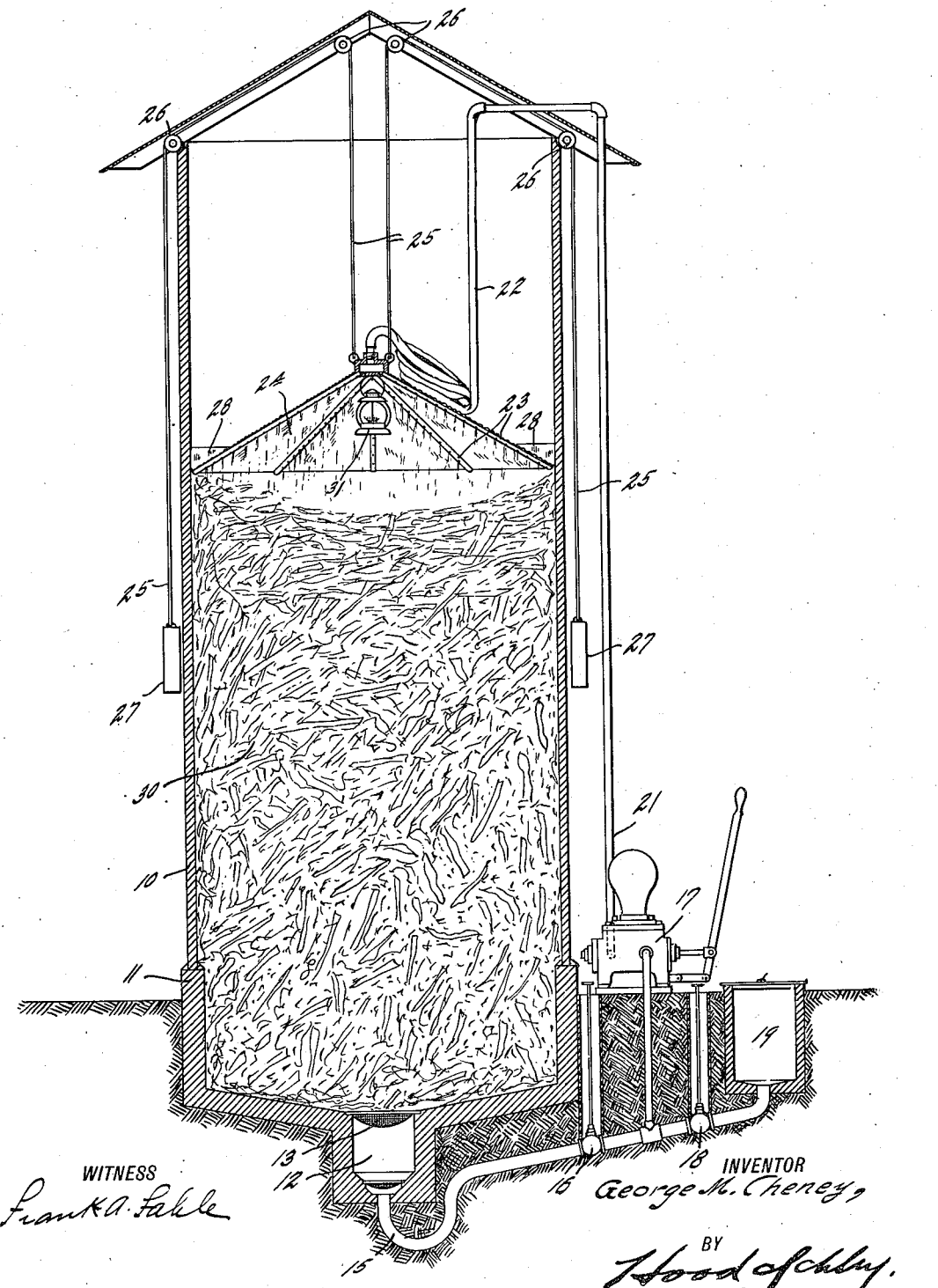
WITNESS
Frank A. Fahle
INVENTOR
George M. Cheney,
BY
Hood & Ashby.
ATTORNEYS

UNITED STATES PATENT OFFICE.

GEORGE M. CHENEY, OF INDIANAPOLIS, INDIANA.

SYSTEM OF ENSILING.

1,188,623.  Specification of Letters Patent.  Patented June 27, 1916.

Application filed June 19, 1915.  Serial No. 35,186.

*To all whom it may concern:*

Be it known that I, GEORGE M. CHENEY, a citizen of the United States, residing at Indianapolis, in the county of Marion and State of Indiana, have invented a new and useful System of Ensiling, of which the following is a specification.

In the preserving of ensilage in silos, the juices which are pressed out of the cut-up corn stalks or other ensilage settles to the bottom of the silo, and as a result the upper part of the ensilage is frequently too dry and ferments insufficiently and the lower part is too moist and ferments too greatly. In addition, sometimes the ensilage as a whole is too dry.

It is the object of my present invention to keep the ensilage in a silo uniformly moist, and sufficiently moist, and to provide for salting or sweetening the ensilage by the addition of extra ingredients when desired, to make a more nearly balanced ration.

It is my further object to provide for thawing out the ensilage when it freezes in cold weather.

In carrying out my invention, I provide a sump in the bottom of the silo, and a pump for pumping the juices which collect in this sump to the top of the silo and there discharging it on to the top of the ensilage into the silo. I also provide means whereby the same pump may be used for pumping brine or weak syrup and discharging it on to the top of the ensilage in the silo. By the same pump, hot water may be pumped into the silo to thaw out any frozen ensilage at the top, at the same time making the ensilage more palatable because of the heating. Preferably the pump discharges beneath a movable counter-balanced hood, which may be raised and lowered as desired so that it is close to the top of the ensilage. This hood serves to prevent the dissipation of the heat of the hot water which is added for thawing the ensilage. If desired, a small heater, such as an oil lantern, may be suspended in this hood for assisting in the heating operation; only a small amount of heat is required with this construction.

The single figure of the accompanying drawing illustrates my invention in its preferred form.

The silo 10 may be of any desired construction, preferably with a concrete cup-shaped foundation 11, in the bottom of which foundation is a sump 12 covered by a screen 13 for preventing the ensilage from getting into the sump. From the bottom of the sump extends a pipe 14, which is provided with a trap 15 for preventing any air from getting into the sump from the outside. The pipe 14 is connected through a shut-off valve 16 to the intake side of a force pump 17. The intake side of this force pump is also connected through a shut-off valve 18 to a cistern 19, having a removable cover 20 whereby syrup, brine, or hot water may be put into the cistern. The valves 16 and 18 and the cistern 19 are preferably located below the ground level, but the valves have handles which project above the ground. From the discharge side of the pump 17 a pipe 21 extends up to the top of the silo, where it communicates by a flexible hose 22 to a plurality of pipes 23 which radiate from the apex of a conical hood 24 which fits loosely in the silo and is supported by cords 25 passing over pulleys 26 to counter-weights 27 whereby the hood may be moved up and down as desired. The edges of the hood are suitably provided with weights 28, which may be in the form of wedge-shaped blocks located between the edge of the hood and the inside of the silo wall. The pipes 23 are provided with perforations on their under surfaces, at convenient points, whereby the fluid forced up by the pump 17 may be discharged downward upon and distributed over the surface of the ensilage 30 in the silo. The hood is made in sections or is otherwise collapsible to permit it to be removed while the silo is being filled.

When the silo is being filled, which operation usually takes several days, the ensilage is put into the silo and packed in the usual manner. The compression of the ensilage squeezes out the juices, to a greater or less extent, and these juices run down to the bottom of the silo where they are caught in the sump 12. As these juices collect, they may be pumped up from time to time by the force pump 17 through the pipe 21, and discharged through the hose 22, either directly or by way of the pipes 23, on to the upper surface of the ensilage in the silo. This may be done both while the silo is being filled, as the juices collect, and after the filling has been completed and during the succeeding months, as long as the juices collect in the sump 12. This maintains an even degree of moisture and fermentation throughout the ensilage. In addition, a weak brine or a weak syrup, or both, may be placed in the cistern 19 and pumped up by the pump 17 and discharged on to the surface of the ensilage. This may be done during the filling operation or afterward, as desired, and the brine or syrup or both may be mixed with the juices from the sump 12, or not, as desired, by manipulating the valves 16 and 18. I now prefer to add brine to the ensilage juices during the filling operation and for a few weeks thereafter, and to discharge syrup on to the ensilage just before feeding, so that the syrup shall not increase the fermentation, but this particular order is not essential.

The hood 24 is moved down as the ensilage is used. In cold weather, when the ensilage freezes, hot water may be put into the cistern 19 and be pumped up by the pump 17 and be discharged through the perforations in the pipes 23. This hot water thaws out the ensilage quite readily, and at the same time moistens it to make it more palatable. This hot water may be sweetened, if desired, to form a weak syrup, which further increases the palatability of the ensilage. The hood 24, being close to the surface of the ensilage, retains the heat of the hot water and makes the thawing action more efficient. If desired, a lantern 31 may be suspended under the hood 24 in cold weather, the heat from the lantern furnishing sufficient heat to keep thawed several inches at the top of the ensilage. In addition, the hood in large part prevents the ensilage from drying out, by preventing the escape of moisture through evaporation and of gases formed during fermentation.

I claim as my invention:

1. In combination, a silo having a sump at the bottom, a pump, and a connection from said sump to the intake of said pump, said pump discharging into the silo at an elevated point.

2. In combination, a silo, a cistern having a filling opening, and a pump having its intake connected with said cistern and discharging to an elevated point into said silo.

3. In combination, a silo, a hood movable vertically in said silo above the ensilage, said hood being provided with a number of perforated pipes, and a pump having its outlet connected to said pipes.

4. In combination, a silo, a hood movable vertically in said silo above the ensilage, said hood being provided with a number of perforated pipes, a pump having its outlet connected to said pipes, said silo having a sump at the bottom, and a connection between said sump and the intake side of said pump.

5. In combination, a silo, and a hood loosely fitting in said silo and movable vertically therealong to inclose a small space over the top of the ensilage.

6. The method of ensiling, which consists in packing the ensilage in a container, and pumping from the bottom of such container to an elevated point therein the juices which are forced out of the ensilage.

7. The method of ensiling, which consists in packing the ensilage in a container, collecting the juices which are forced out of the ensilage by the compression, and pouring such juices over the ensilage during the filling operation.

8. The method of ensiling, which consists in packing the ensilage in a container, collecting the juices which are forced out of the ensilage by the compression, and pouring such juices over the ensilage.

9. The method of ensiling, which consists in packing the ensilage in a container, and discharging weak brine upon the ensilage during the filling of the container.

10. The method of ensiling, which consists in packing the ensilage in a container, and discharging weak brine upon the ensilage.

11. The method of ensiling, which consists in packing the ensilage in a container, and discharging a weak syrup over the ensilage shortly before feeding the ensilage.

12. The method of ensiling, which consists in packing the ensilage in a container, and discharging a weak syrup over the ensilage.

13. The method of ensiling, which consists in storing the ensilage in a container, and thawing out any frozen ensilage at the top of the stored ensilage by discharging hot liquid thereon, and placing over the ensilage a cover which resists the dissipation of the heat of such hot liquid.

14. In combination, a silo having a sump at the bottom, a pump, a connection from said sump to the intake of said pump, said pump discharging into the silo at an elevated point, and said connection having a trap for preventing ingress of air to the silo through such connection.

15. In combination, a silo having a sump at the bottom, a pump, a connection from said sump to the intake of said pump, said pump discharging into the silo at an elevated point, and a screen over said sump.

16. The method of ensiling, which consists in packing the ensilage in a container, collecting the juices which are forced out of the ensilage by the compression, pouring such juices and weak brine over the ensilage during the filling of the container, and pouring a weak syrup over the ensilage shortly before feeding the ensilage.

17. The method of ensiling, which consists in packing the ensilage in a container, pouring weak brine over the ensilage during the filling of the container, and pouring a weak syrup over the ensilage shortly before feeding the ensilage.

18. The method of ensiling, which consists in packing the ensilage in a container, collecting the juices which are forced out of the ensilage by the compression, pouring such juices over the ensilage during the filling of the container, and pouring a weak syrup over the ensilage shortly before feeding the ensilage.

19. The method of ensiling, which consists in packing the ensilage in a container, and discharging a hot weak syrup over the ensilage shortly before feeding the ensilage, so as to thaw out any frozen ensilage and make a more balanced ration.

In witness whereof, I have hereunto set my hand at Indianapolis, Indiana, this sixteenth day of June, A. D. one thousand nine hundred and fifteen.

GEORGE M. CHENEY.